US006818583B1

(12) United States Patent
Morini et al.

(10) Patent No.: US 6,818,583 B1
(45) Date of Patent: Nov. 16, 2004

(54) COMPONENTS AND CATALYSTS FOR THE POLYMERIZATION OF OLEFINS

(75) Inventors: Giampiero Morini, Padua (IT); Giulio Balbontin, Ferrara (IT); Yuri. V Gulevich, Elkton, MD (US); Henricus P. B. Duijghuisen, Almere (NL); Remco T. Kelder, Hoevelaken (NL); Peter A.A . Klusener, Utrecht (NL); Franciscus M. Korndorffer, Katwijk aan zee (NL)

(73) Assignee: Basell Poliolefine Italia S.p.A., Milan (IT)

( * ) Notice: Subject to any disclaimer, the term of this patent is extended or adjusted under 35 U.S.C. 154(b) by 0 days.

(21) Appl. No.: 09/762,363

(22) PCT Filed: Apr. 12, 2000

(86) PCT No.: PCT/EP00/03333

§ 371 (c)(1),
(2), (4) Date: Feb. 5, 2001

(87) PCT Pub. No.: WO00/63261

PCT Pub. Date: Oct. 26, 2000

(30) Foreign Application Priority Data

Apr. 15, 1999  (EP) .............................................. 99201172

(51) Int. Cl.$^7$ ........................... B01J 31/00; B01J 33/00; C08F 4/02; C08F 4/60
(52) U.S. Cl. ..................................................... 502/103
(58) Field of Search ........................................ 502/103

(56) References Cited

U.S. PATENT DOCUMENTS

| | | | |
|---|---|---|---|
| 4,220,554 A | 9/1980 | Scata et al. | 252/429 B |
| 4,298,718 A | 11/1981 | Mayr et al. | 526/125 |
| 4,399,054 A | 8/1983 | Ferraris et al. | 252/429 B |
| 4,469,648 A | 9/1984 | Ferraris et al. | 264/9 |
| 4,495,338 A | 1/1985 | Mayr et al. | 526/125 |
| 5,412,020 A * | 5/1995 | Yamamoto et al. | 524/505 |
| 5,451,642 A * | 9/1995 | Abe et al. | 525/179 |
| 5,504,169 A * | 4/1996 | Canich | 526/127 |
| 5,532,325 A | 7/1996 | Oka et al. | 526/76 |
| 6,265,512 B1 * | 7/2001 | Siedle et al. | 526/351 |
| 6,320,009 B1 * | 11/2001 | Nakano et al. | 526/351 |

FOREIGN PATENT DOCUMENTS

| | | | |
|---|---|---|---|
| EP | 0086473 | 8/1983 | .......... C08F/10/00 |
| EP | 0125911 | 11/1984 | .......... C08F/10/00 |
| EP | 0208524 | 1/1987 | ............. C08F/4/64 |
| EP | 0263718 | 4/1988 | ......... C08F/210/16 |
| EP | 0360491 | 3/1990 | .......... C08F/10/00 |
| EP | 0360497 | 3/1990 | .......... C08F/10/00 |
| EP | 0362705 | 4/1990 | .......... C08F/10/00 |
| EP | 0395083 | 10/1990 | ............. C08F/4/02 |
| EP | 0553805 | 8/1993 | .......... C08F/10/00 |
| EP | 0553806 | 8/1993 | .......... C08F/10/00 |
| EP | 0601525 | 6/1994 | .......... C08F/4/654 |
| EP | 0702052 | 3/1996 | ............. C08K/5/18 |
| EP | 0919572 | 6/1999 | .......... C08F/10/06 |
| JP | 58138709 | 8/1983 | |
| JP | 2173105 | 7/1990 | |
| WO | 9844009 | 10/1998 | ............. C08F/4/02 |

OTHER PUBLICATIONS

N. Petragnani et al., Synthesis, p. 710–713 (1980).
T. J. Brocksom et al., Synthesis, p. 396–397 (1975).
N.R. Long et al., Synthetic Communications, 11(9): 687–696 (1981).
E. N. Jacobsen et al., Synthetic Communications, 15(4): 301–306 (1985).
W. G. Kofron et al., J. Org. Chem., 37(4): 555–559 (1972).
J. L. Belletire et al., .Tetrahedron Letters, 25(52): 5969–5972 (1984).
Vogel's *Textbook of Practical Organic Chemistry*, 5$^{th}$ Edition, p. 695–707 (1989).
Taiwanese Publication NO. 70868 (Application No. 7213070) filed Sep. 6, 1983 entitled "the Catalysts for the Polymerization of Olefins;" published Oct. 1, 1985 (partial translation).

* cited by examiner

Primary Examiner—Mark L. Bell
Assistant Examiner—Jennine M. Brown

(57) ABSTRACT

The present invention relates to a solid catalyst component for the polymerization of olefins $CH_2=CHR$ in which R is hydrogen or a hydrocarbon radical with 1–12 carbon atoms, comprising Mg, Ti, halogen and an electron donor selected from substituted succinates of a particular formula. Said catalyst components when used in the polymerization of olefins, and in particular of propylene, are capable to give polymers in high yields and with high isotactic index expressed in terms of high xylene insolubility.

41 Claims, No Drawings

COMPONENTS AND CATALYSTS FOR THE POLYMERIZATION OF OLEFINS

This application is the U.S. national phase of International Application PCT/EP00/03333, filed Apr. 12, 2000.

The present invention relates to catalyst components for the polymerization of olefins, to the catalyst obtained therefrom and to the use of said catalysts in the polymerization of olefins $CH_2$=CHR in which R is hydrogen or a hydrocarbyl radical with 1–12 carbon atoms. In particular the present invention relates to catalyst components, suitable for the stereospecific polymerization of olefins, comprising Ti, Mg, halogen and an electron donor compound selected from esters of substituted succinic acids (substituted succinates). Said catalyst components when used in the polymerization of olefins, and in particular of propylene, are capable to give polymers in high yields and with high isotactic index expressed in terms of high xylene insolubility.

The chemical class of succinates is known in the art. However, the specific succinates of the present invention have never been used as internal electron donors in catalysts for the polymerization of olefins.

EP-A-86473 mentions the use of unsubstituted succinates as internal donors in catalyst components for the polymerization of olefins. The use of diisobutyl succinate and di-n-butyl succinate is also exemplified. The results obtained in terms of isotactic index and yields are however poor.

The use of polycarboxylic acid esters, including succinates, as internal donors in catalyst components for the polymerization of olefins, is also generically disclosed in EP 125911. Diethyl methylsuccinate and diallyl ethylsuccinate are mentioned in the description although they are not exemplified Furthermore, EP263718 mentions, but does not exemplify the use of diethyl methylsuccinate and di-n-butyl ethylsuccinate as internal donors. In order to check the performances of these succinates according to the teaching of the art the applicant has carried out some polymerization tests employing catalyst components containing diethyl methylsuccinate and diisobutyl ethylsuccinate, respectively, as internal donors. As shown in the experimental section, both the so obtained catalysts gave an unsatisfactory activity/stereospecificity balance very similar to that obtained with catalysts containing unsubstituted succinates.

It has been therefore very surprising to discover that the specific substitution in the succinates of the invention generates compounds that, when used as internal donors, give catalyst components having excellent activity and stereospecificity.

It is therefore an object of the present invention to provide a solid catalyst component for the polymerization of olefins $CH_2$=CHR in which R is hydrogen or a hydrocarbon radical with 1–12 carbon atoms, comprising Mg, Ti, halogen and an electron donor selected from succinates of formula (I):

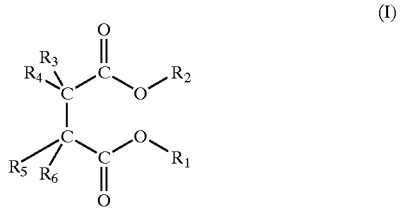

(I)

wherein the radicals $R_1$ and $R_2$, equal to, or different from, each other are a $C_1$–$C_{20}$ linear or branched alkyl, alkenyl, cycloalkyl, aryl, arylalkyl or alkylaryl group, optionally containing heteroatoms; the radicals $R_3$ to $R_6$ equal to, or different from, each other, are hydrogen or a $C_1$–$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle; with the proviso that when $R_3$ to $R_5$ are contemporaneously hydrogen $R_6$ is a radical selected from primary branched, secondary or tertiary alkyl groups, cycloalkyl, aryl, arylalkyl or alkylaryl groups having from 3 to 20 carbon atoms.

$R_1$ and $R_2$ are preferably $C_1$–$C_8$ alkyl, cycloalkyl, aryl arylalyl and alkylaryl groups. Particularly preferred are the compounds in which $R_1$ and $R_2$ are selected from primary alkyls and in particular branched primary alkyls. Examples of suitable $R_1$ and $R_2$ groups are methyl, ethyl, n-propyl, n-butyl, isobutyl neopentyl, 2-ethylhexyl. Particularly preferred are ethyl, isobutyl, and neopentyl. One of the preferred groups of compounds described by the formula (I) is that in which $R_3$ to $R_5$ are hydrogen and $R_6$ is a branched alkyl, cycloalkyl, aryl, arylalkyl and alkylaryl radical having from 3 to 10 carbon atoms. Particularly preferred are the compounds in which $R_6$ is a branched primary alkyl group or a cycloalkyl group having from 3 to 10 carbon atoms.

Specific examples of suitable monosubstituted succinate compounds are diethyl sec-butylsuccinate, diethyl thexylsuccinate, diethyl cyclopropylsuccinate, diethyl norbornylsuccinate, diethyl (10-)perhydronaphthylsuccinate, diethyl trimethylsilylsuccinate, diethyl methoxysuccinate, diethyl p-methoxyphenylsuccinate, diethyl p-chlorophenylsuccinate diethyl phenylsuccinate, diethyl cyclohexylsuccinate, diethyl benzylsuccinate, diethyl (cyclohexylmethyl)succinate, diethyl t-butylsuccinate, diethyl isobutylsuccinate, diethyl isopropylsuccinate, diethyl neopentylsuccinate, diethyl isopentylsuccinate, diethyl (1,1,1-trifluoro-2-propyl)succinate, diethyl (9-fluorenyl,succinate, diisobutyl phenylsuccinate, diisobutyl sec-butylsuccinate, diisobutyl thexylsuccinate, diisobutyl cyclopropylsuccinate, diisobutyl (2-norbornyl)succinate, diisobutyl (10-)perhydronaphthylsuccinate, diisobutyl trimethylsilylsuccinate, diisobutyl methoxysuccinate, diisobutyl p-methoxyphenylsuccinate, diisobutyl p-chlorophenylsuccinate, diisobutyl cyclohexylsuccinate, diisobutyl benzylsuccinate, diisobutyl (cyclohexylmethyl)succinate, diisobutyl t-butylsuccinate, diisobutyl isobutylsuccinate, diisobutyl isopropylsuccinate, diisobutyl neopentylsuccinate, diisobutyl isopentylsuccinate, diisobutyl (1,1,1-trifluoro-2-propyl)succinate, diisobutyl (9-fluorenyl)succinate, dineopentyl sec-butylsuccinate, dineopentyl thexylsuccinate, dineopentyl cyclopropylsuccinate, dineopentyl (2-norbornyl)succinate, dineopentyl (10-)perhydronaphthylsuccinate, dineopentyl trimethylsilylsuccinatc, dineopentyl methoxysuccinate, dineopentyl p-methoxyphenylsuccinate, dineopentyl p-chlorophenylsuccinate, dineopentyl, phenylsuccinate, dineopentyl cyclohexylsuccinate, dineopentyl benzylsuccinate, dineopentyl (cyclohexylmethyl)succinate, dineopentyl t-butylsuccinate, dineopentyl isobutylsuccinate, dineopentyl isopropylsuccinate, dineopentyl neopentylsuccinate, dineopentyl isopentylsuccinate, dineopentyl (1,1,1-trifluoro-2-propyl)succinate, dineopentyl (9-fluorenyl)succinate.

Another preferred group of compounds within those of formula (I) is that in which at least two radicals from $R_3$ to $R_6$ are different from hydrogen and are selected from $C_1$–$C_{20}$ linear or branched alkyl, alkenyl, cycloalkyl, aryl, arylalkyl or alkylaryl group, optionally containing heteroatoms. Particularly preferred are the compounds in which the two radicals different from hydrogen are linked to the same carbon atom. Specific examples of suitable 2,2-disubstituted succinates are: diethyl 2,2-dimethylsuccinate, diethyl 2-ethyl-2-methylsuccinate, diethyl 2-benzyl-2-isopropylsuccinate, diethyl 2-(cyclohexylmethyl)-2-isobutylsuccinate, diethyl 2-cyclopentyl-2-n-propylsuccinate, diethyl 2,2-diisobutylsuccinate, diethyl 2-cyclohexyl-2-ethylsuccinate, diethyl 2-isopropyl-2-methylsuccinate, diethyl 2,2-diisopropyl diethyl 2-isobutyl-2-ethylsuccinate, diethyl 2-(1,1,1-trifluoro-2-propyl)2-methylsuccinate, diethyl 2-isopentyl-2-isobutylsuccinate, diethyl 2-phenyl-2-n-butylsuccinate, diisobutyl 2,2-dimethylsuccinate, diisobutyl 2-ethyl-2-methylsuccinate, diisobutyl 2-benzyl-2-isopropylsuccinate, diisobutyl 2-(cyclohexylmethyl)2-isobutylsuccinate, diisobutyl 2-cyclopentyl-2-n-propylsuccinate, diisobutyl 2,2-diisobutylsuccinate, diisobutyl 2-cyclohexyl-2-ethylsuccinate, diisobutyl 2-isopropyl-2-methylsuccinate, diisobutyl 2-isobutyl-2-ethylsuccinate, diisobutyl 2-(1,1,1-trifluoro-2-propyl)-2-methylsuccinate, diisobutyl 2-isopentyl-2-isobutylsuccinate, diisobutyl 2,2-diisopropylsuccinate, diisobutyl 2-phenyl-2-n-propylsuccinate, dineopentyl 2,2-dimethylsuccinate, dineopentyl 2-ethyl-2-methylsuccinate, dineopentyl 2-benzyl-2-isopropylsuccinate, dineopentyl 2-(cyclohexylmethyl)-2-isobutylsuccinate, dineopentyl 2cyclopentyl-2-n-propylsuccinate, dineopentyl 2,2-diisobutylsuccinate, dineopentyl 2-cyclohexyl-2-ethylsuccinate, dineopentyl 2-isopropyl-2-methylsuccinate, dineopentyl 2-isobutyl-2-ethylsuccinate, dineopentyl 2-(1,1,1-trifluoro-2-propyl)-2-methylsuccinate, dineopentyl 2,2-diisopropylsuccinate, dineopentyl 2-isopentyl-2-isobutylsuccinate, dineopentyl 2-phenyl-2-n-butylsuccinate.

Furthermore, also the compounds in which at least two radicals different from hydrogen are linked to different carbon atoms, that is $R_3$ and $R_5$ or $R_4$ and $R_6$ are particularly preferred. Specific examples of suitable compounds are: diethyl 2,3-bis(trimethylsilyl)succinate, diethyl 2,2-sec-butyl-3-methylsuccinate, diethyl 2-(3,3,3-trifluoropropyl)-3-methylsuccinate, diethyl 2,3-bis(2-ethylbutyl)succinate, diethyl-2,3-ethyl-2-isopropyl succinate, diethyl 2,3-diisopropyl-2-methylsuccinate, diethyl 2,3-dicyclohexyl-2-methylsuccinate, diethyl 2,3-dibenzylsuccinate, diethyl 2,3-diisopropylsuccinate, diethyl 2,3-bis(cyclohexylmethyl)succinate, diethyl 2,3-di-t-butylsuccinate, diethyl 2,3-diisobutylsuccinate, diethyl 2,3-dineopentylsuccinate, diethyl 2,3-diisopentylsuccinate, diethyl 2,3-(1-trifluoromethyl-ethyl)succinate, diethyl 2,3(9-fluorenyl)succinate, diethyl 2-isopropyl-3-isobutylsuccinate, diethyl 2-t-butyl-3-isopropylsuccinate, diethyl 2-isopropyl-3-cyclohexylsuccinate, diethyl 2-isopentyl-3-cyclohexylsuccinate, diethyl $^2$-cyclohexyl-3-cyclopentylsuccinate, diethyl 2,2,3,3-tetramethylsuccinate, diethyl 2,2,3,3-tetraethylsuccinate, diethyl 2,2,3,3-tetrapropylsuccinate, diethyl 2,3-diethyl-2,3-diisopropylsuccinate, diisobutyl 2,3-bis(trimethylsilyl)succinate, diisobutyl 2,2-sec-butyl-3-methylsuccinate, diisobutyl 2(3,3,3-trifluoropropyl)-3-methylsuccinate, diisobutyl 2,3-bis(2-ethylbutyl)succinate, diisobutyl 2,3diethyl-2-isopropylsuccinate, diisobutyl 2,3-diisopropyl-2-methylsuccinate, diisobutyl 2,3-dicyclohexyl-2-methylsuccinate, diisobutyl 2,3-dibenzylsuccinate, diisobutyl 2,3-diisopropylsuccinate, diisobutyl 2,3-bis(cyclohexylmethyl)succinate, diisobutyl 2,3-di-t-butylsuccinate, diisobutyl 2,3-diisobutylsuccinate, diisobutyl 2,3-dineopentylsuccinate, diisobutyl 2,3-diisopentylsuccinate, diisobutyl 2,3-(1,1,1-trifluoro-2-propyl)succinate, diisobutyl 2,3-n-propylsuccinate, diisobutyl 2,3-(9-fluorenyl)succinate, diisobutyl 2-isopropyl-3-ibutylsuccinate, diisobutyl 2-terbutyl-3-ipropylsuccinate, diisobutyl 2-isopropyl-3-cyclohexylsuccinate, diisobutyl 2-isopentyl-3-cyclohexylsuccinate, diisobutyl 2-n-propyl-3-(cyclohexylmethyl)succinate, diisobutyl 2-cyclohexyl-3-cyclopentylsuccinate, diisobutyl 2,2,3,3-tetramethylsuccinate, diisobutyl 2,2,3,3-tetraethylsuccinate, diisobutyl 2,2,3,3-tetrapropylsuccinate, diisobutyl 2,3-diethyl-2,3-diisopropylsuccinate, dineopentyl 2,3-bis(trimethylsilyl)succinate, dineopentyl 2,2-di-sec-butyl-3-methylsuccinate, dineopentyl 2-(3,3,3-trifluoropropyl)-3-methylsuccinate, dineopentyl 2,3-bis(2-ethylbutyl) succinate, dineopentyl 2,3-diethyl-2-isopropylsuccinate, dineopentyl 2,3-diisopropyl-2-methylsuccinate, dineopentyl 2,3-dicyclohexyl-2-methylsuccinate, dineopentyl 2,3-dibenzylsuccinate, dineopentyl 2,3-diisopropylsuccinate, dineopentyl 2,3-bis(cyclohexylmethyl)succinate, dineopentyl 2,3-di-t-butylsuccinate, dineopentyl 2,3-diisobutylsuccinate, dineopentyl 2,3-dineopentylsuccinate, dineopentyl 2,3-diisopentylsuccinate, dineopentyl 2,3-(1,1,1-trifluoro-2-propyl)succinate, dineopentyl 2,3-n-propylsuccinate, dineopentyl 2,3(9-fluorenyl)succinate, dineopentyl 2-isopropyl-3-isobutylsuccinate, dineopentyl 2-t-butyl-3-isopropylsuccinate, dineopentyl 2-isopropyl-3-cyclohexylsuccinate, dineopentyl 2-isopentyl-3-cyclohexylsuccinate, dineopentyl 2-n-propyl-3-(cyclohexylmethyl)succinate, dineopentyl 2-cyclohexyl-3-cyclopentylsuccinate, dineopentyl 2,2,3,3-tetramethylsuccinate, dineopentyl 2,2,3,3-tetraethylsuccinate, dineopentyl 2,2,3,3-tetrapropylsuccinate, dineopentyl 2,3-diethyl-2,3-diisopropylsuccinate.

As mentioned above the compounds according to formula (I) in which two or four of the radicals $R_3$ to $R_6$ which are joined to the same carbon atom are linked together to form a cycle are also preferred.

Specific examples of suitable compounds are 1-(ethoxycarbonyl)-1-(ethoxyacetyl)-2,6-dimethylcyclohexane, 1-(ethoxycarbonyl)-1-(ethoxyacetyl)-2,5-dimethylcyclopentane, 1-(ethoxycarbonyl)-1-(ethoxyacetylmethyl)-2-methylcyclohexane, 1-(ethoxycarbonyl)-1-(ethoxy(cyclohexyl)acetyl) cyclohexane.

It is easily derivable for the ones skilled in the art that all the above mentioned compounds can be used either in form of pure stereoisomers or in the form of mixtures of enantiomers, or mixture of diastereoisomers and enantiomers. When a pure isomer is to be used it is normally isolated using the common techniques known in the art. In particular some of the succinates of the present invention can be used as a pure rac or meso forms, or as mixtures thereof, respectively.

As explained above, the catalyst components of the invention comprise, in addition to the above electron donors, Ti, Mg and halogen. In particular, the catalyst components comprise a titanium compound, having at least a Ti-halogen bond and the above mentioned electron donor compound supported on a Mg halide. The magnesium halide is preferably $MgCl_2$ in active form which is widely known from the patent literature as a support for Ziegler-Natta catalysts. Patents U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is broadened to form a halo.

The preferred titanium compounds used in the catalyst component of the present invention are $TiCl_4$ and $TiCl_3$; furthermore, also Ti-haloalcoholates of formula $Ti(OR)_{n-y}X_y$, where n is the valence of titanium, X is halogen and y is a number between 1 and n, can be used.

The preparation of the solid catalyst component can be carried out according to several methods. According to one of these methods, the magnesium dichloride in an anhydrous state and the succinate of formula (I) are milled together under conditions in which activation of the magnesium dichloride occurs. The so obtained product can be treated one or more times with an excess of $TiCl_4$ at a temperature between 80 and 135° C. This treatment is followed by washings with hydrocarbon solvents until chloride ions disappeared. According to a further method, the product obtained by co-milling the magnesium chloride in an anhydrous state, the titanium compound and the substituted succinate is treated with halogenated hydrocarbons such as 1,2-dichloroethane, chlorobenzene, dichloromethane, etc. The treatment is carried out for a time between 1 and 4 hours and at temperature of from 40° C. to the boiling point of the halogenated hydrocarbon. The product obtained is then generally washed with inert hydrocarbon solvents such as hexane.

According to another method, magnesium dichloride is preactivated according to well known methods and then treated with an excess of $TiCl_4$ at a temperature of about 80 to 135° C. which contains, in solution, a succinate of formula (I). The treatment with $TiCl_4$ is repeated and the solid is washed with hexane in order to eliminate any non-reacted $TiCl_4$.

A further method comprises the reaction between magnesium alcoholates or chloroalcoholates (in particular chloroalcoholates prepared according to U.S. Pat No. 4,220,554) and an excess of $TiCl_4$ comprising the succinate of formula (I) in solution at a temperature of about 80 to 120° C.

According to a preferred method, the solid catalyst component can be prepared by reacting a titanium compound of formula $Ti(OR)_{n-y}X_y$, where n is the valence of titanium and y is a number between 1 and n, preferably $TiCl_4$, with a magnesium chloride deriving from an adduct of formula $MgCl_2 \cdot pROH$, where p is a number between 0.1 and 6, preferably from 2 to 3.5, and R is a hydrocarbon radical having 1–18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100–130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat No. 4,469,648. The so obtained adduct can be directly reacted with the Ti compound or it can be previously subjected to thermally controlled dealcoholation (80–130° C.) so as to obtain an adduct in which the number of moles of alcohol is generally lower than 3 preferably between 0.1 and 2.5. The reaction with the Ti compound can be carried out by suspending the adduct (dealcoholated or as such) in cold $TiCl_4$ (generally 0° C.); the mixture is heated up to 80–130° C. and kept at this temperature for 0.5–2 hours. The treatment with $TiCl_4$ can be carried out one or more times.

The succinate of formula (I) can be added during the treatment with $TiCl_4$. The treatment with the electron donor compound can be repeated one or more times.

The preparation of catalyst components in spherical form is described for example in European Patent Application EP-A-395083, EP-A-553805, EP-A-553806, EPA-601525 and WO98/44009.

The solid catalyst components obtained according to the above method show a surface area (by B.E.T. method) generally between 20 and 500 $m^2/g$ and preferably between 50 and 400 $m^2/g$, and a total porosity (by B.E.T. method) higher than 0.2 $cm^3/g$ preferably between 0.2 and 0.6 $cm^3/g$. The porosity (Hg method) due to pores with radius up to 10000 Å generally ranges from 0.3 to 1.5 $cm^3/g$, preferably from 0.45 to 1 $cm^3/g$.

A further method to prepare the solid catalyst component of the invention comprises halogenating magnesium dihydrocarbyloxide compounds, such as magnesium dialkoxide or diaryloxide, with solution of $TiCl_4$ in aromatic hydrocarbon (such as toluene, xylene, etc.) at temperatures between 80 and 130° C. The treatment with $TiCl_4$ in aromatic hydrocarbon solution can be repeated one or more times, and the β-substituted succinate is added during one or more of these treatments.

In any of these preparation methods the desired succinate of formula (I) can be added as such or, in an alternative way, it can be obtained in situ by using an appropriate precursor capable to be transformed in the desired electron donor compound by means, for example, of known chemical reactions such as esterification, transesterification, etc. Generally, the succinate of formula (I) is used in molar ratio with respect to the $MgCl_2$ of from 0.01 to 1 preferably from 0.05 to 0.5. Moreover, and this constitutes another object of the present invention, it has been found that interesting results are obtained when others internal electron donor compounds are used together in with the succinates of formula (I). The additional electron donor compound can be the same as the electron donor (d) disclosed below. In particular very good results are been obtained when the 1,3-diethers of formula (II) below are used as internal donors together with a succinate of formula (I).

The solid catalyst components according to the present invention are converted into catalysts for the polymerization of olefin by reacting them with organoaluminum compounds according to known methods.

In particular, it is an object of the sent invention a catalyst for the polymerization of olefins $CH_2=CHR$, in which R is hydrogen or a hydrocarbyl radical with 1–12 carbon atoms, comprising the product of the reaction between:

(a) a solid catalyst component comprising a Mg, Ti and halogen and an electron donor selected from succinates of formula (I);
(b) an alkylalumninun compound and, optionally,
(c) one or more electron donor compounds (external donor).

The alkylaluminum compound (b) is preferably selected from the trialkyl aluminum compounds such as for example triethylaluminun, triisobutylaluminum, tri-n-butylaluminum, tri-n-hexylaluminum, tri-n-octylaluminun. It is also possible to use mixtures of trialkylaluminum's with alkylaluminum halides, alkylaluminum hydrides or alkylaluminum sesquichlorides such as $AlEt_2Cl$ and $Al_2Et_3Cl_3$. Also alkylalumoxanes can be used.

It is a particular interesting aspect of the invention the fact that the above described catalysts are able to give polymers with high isotactic index even when the polymerization is carried out in the absence of an external donor (c). In particular, operating for example according to the working examples described below propylene polymers having an isotactic index around 96% are obtained to without using an external donor compound. These kind of products are very interesting for applications in which the crystallinity of the polymer should not be at its maximum level. This particular behavior is very surprising in view of the fact that the esters of dicarboxylic acids known in the art, when used as internal donors, give polymers with a poor isotactic index when the polymerization is carried out in the absence of an external electron donor compound.

For applications in which a very high isotactic index is required the use of an external donor compound is normally advisable. The external donor (c) can be of the same type or it can be different from the succinate of formula (I). Preferred external electron donor compounds include silicon compounds, ethers, esters, such as ethyl 4-etoxybenzoate, amines, heterocyclic compounds and particularly 2,2,6,6-tetramethylpiperidine, ketones and the 1,3-diethers of the general formula (II):

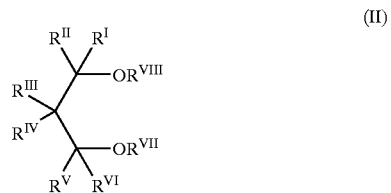

wherein $R^I$, $R^{II}$, $R^{III}$, $R^{IV}$, $R^V$ and $R^{VI}$ are equal or different to each other, are hydrogen or hydrocarbon radicals having from 1 to 18 carbon atoms, and $R^{VII}$ and $R^{VIII}$, equal or different from each other, have the same meaning of $R^I$–$R^{VI}$ except that they cannot be hydrogen; one or more of the $R^I$–$R^{VIII}$ groups can be linked to form a cycle. Particularly preferred are the 1,3-diethers in which $R^{VII}$ and $R^{VIII}$ are selected from $C_1$–$C_4$ alkyl radicals, $R^{III}$ and $R^{IV}$ form a condensed unsaturated cycle and $R^I$, $R^{II}$, $R^V$ and $R^{VI}$ are hydrogen. The use of 9,9-bis(methoxymethyl)fluorene is particularly preferred.

Another class of preferred external donor compounds is that of silicon compounds of formula $R_a^7 R_b^8 Si(OR^9)_c$, where a and b are integer from 0 to 2, c is an integer from 1 to 3 and the sum (a+b+c) is 4; $R^7$, $R^8$, and $R^9$, are C1–C18 hydrocarbon groups optionally containing heteroatoms. Particularly preferred are the silicon compounds in which a is 1, b is 1, c is 2, at least one of $R^7$ and $R^8$ is selected from branched alkyl, alkenyl, alkylene, cycloalkyl or aryl groups with 3–10 carbon atoms optionally containing heteroatoms and $R^9$ is a $C_1$–$C_{10}$ alkyl group, in particular methyl. Examples of such preferred silicon compounds are cyclohexylmethyldinethoxysilane, diphenyldimethoxysilane, methyl-t-butyldimethoxysilane, dicyclopentyldimethoxysilane, 2-ethylpiperidinyl-2-t-butyldimethoxysilane and (1,1,1-trifluoro-2-propyl)-2-ethylpiperidinyldimethoxysilane and (1,1,1-trifluoro-2-propyl)methyldimethoxysilane. Moreover, are also preferred the silicon compounds in which a is 0, c is 3, $R^8$ is a branched alkyl or cycloalkyl group, optionally containing heteroatoms, and $R^9$ is methyl. Examples of such preferred silicon compounds are cyclohexyltrimethoxysilane, t-butyltriethoxysilane and thexyltrimethoxysilane.

The electron donor compound (c) is used in such an amount to give a molar ratio between the organoaluminum compound and said electron donor compound (c) of from 0.1 to 500, preferably from 1 to 300 and more preferably from 3 to 100. As previously indicated, when used in the (co) polymerization of olefins, and in particular of propylene, the catalysts of the invention allow to obtain, with high yields, polymers having a high isotactic index (expressed by high xylene insolubility X.I.), thus showing an excellent balance of properties. This is particularly surprising in view of the fact that, as it can be seen from the comparative examples here below reported, the use as internal electron donors of α-substituted or unsubstituted succinate compounds gives worse results in term of yields and/or xylene insolubility.

As mentioned above, the succinates of formula (I) can be used also as external donors with good results. In particular, it has been found that they are able to give very good results even when they are used as external electron donor compounds in combination with catalyst components containing an internal donor different from the succinates of formula (I). This is very surprising because the esters of dicarboxylic acids known in the art are normally not able to give satisfactory results when used as external donors. On the contrary, the succinates of the formula (I) are able to give polymers still having a good balance between isotactic index and yields. It is therefore another object of the present invention a catalyst system for the polymerization of olefins $CH_2$=CHR, in which R is hydrogen or a hydrocarbyl radical with 1–12 carbon atoms, comprising the product of the reaction between:

(i) a solid catalyst component comprising a Mg, Ti and halogen and an electron donor (d);
(ii) an alkylaluminum compound and,
(iii) a succinate of formula (I).

The aluminum alkyl compound (ii) has the same meanings of the aluminum compound (b) given above. The electron donor compound (d) can be selected from ethers, esters of organic mono or bicarboxylic acids, such as phthalates, benzoates, glutarates, succinates having a different structure from those of formula (I), amines. Preferably, it is selected from 1,3-propanediethers of formula (II) and esters of organic mono or bicarboxylic acids in particular pbthalates.

As mentioned above all these catalysts can be used in the processes for the polymerization of olefins $CH_2$=CHR, in which R is hydrogen or a hydrocarbyl radical with 1–12 carbon atoms. The preferred α-olefins to be (co)polymerized are ethene, propene, 1-butene, 4methyl-1-pentene, 1-hexene and 1-octene. In particular, the above-described catalysts have been used in the (co)polymerization of propene and ethylene to prepare different kinds of products. For example the following products can be prepared: high density ethylene polymers (HDPE, having a density higher than 0.940 g/cm³), comprising ethylene homopolymers and copolymers of ethylene with α-olefins having 3–12 carbon atoms; linear low density polyethylenes (LLDPE, having a density lower than 0.940 g/cm³) and very low density and ultra low density (VLDPE and ULDPE, having a density lower than 0.920 g/cm³, to 0.880 g/cm³) consisting of copolymers of ethylene with one or more α-olefins having from 3 to 12 carbon atoms, having a mole content of units derived from the ethylene higher than 80%; elastomeric copolymers of ethylene and propylene and elastomeric terpolymers of ethylene and propylene with smaller proportions of a diene having a content by weight of units derived from the ethylene comprised between about 30 and 70%, isotactic polypropylenes and crystalline copolymers of propylene and ethylene and/or other α-olefins having a content of units derived from propylene higher tan 85% by weight (random copolymers); shock resistant polymers of propylene obtained by sequential polymerization of propylene and mixtures of propylene with ethylene, containing up to 30% by weight of ethylene; copolymers of propylene and 1-butene having a number of units derived from 1-butene comprised between 10 and 40% by weight. Particularly interesting are the propylene polymers obtainable with the catalyst of the invention showing broad MWD coupled with high isotactic index and high modulus. In fact, said polymers having a polydispersity index of higher than 5, a content of isotactic units expressed in terms of pentads of higher than 97% and a flexural modulus of at least 2000 MPa. Preferably, the polydispersity index is higher than 5.1, the flexural modulus is higher than 2100 and the percent of propylene units in form of pentads is higher than 97.5%.

Any kind of polymerization process can be used with the catalysts of the invention that are very versatile. The polymerization can be carried out for example in slurry using as diluent an inert hydrocarbon solvent, or in bulk using the liquid monomer (for example propylene) as a reaction medium. Moreover, it is possible to carry out the polymerization process in gas-phase operating in one or more fluidized or mechanically agitated bed reactors.

The catalyst of the present invention can be used as such in the polymerization process by introducing it directly into the reactor. In the alternative, the catalyst can be pre-polymerized before being introduced into the first polymerization reactor. The term pre-polymerized, as used in the art, means a catalyst which has been subject to a polymerization step at a low conversion degree. According to the present invention a catalyst is considered to be pre-polymerized when the amount the polymer produced is from about 0.1 up to about 1000 g per gram of solid catalyst component.

The prepolymerization can be carried out with the α-olefins selected from the same group of olefins disclosed before. In particular, it is especially preferred pre-polymeric ethylene or mixtures thereof with one or more α-olefins in an amount up to 20% by mole. Preferably, the conversion of the pre-polymerized catalyst component is from about 0.2 g up to about 500 g per gram of solid catalyst component.

The pre-polymerization step can be carried out at temperatures from 0 to 80° C. preferably from 5 to 50° C. in liquid or gas-phase. The pre-polymerization step can be performed in-line as a part of a continuous polymerization process or separately in a batch process. The batch pre-polymerization of the catalyst of the invention with ethylene in order to produce an amount of polymer ranging from 0.5 to 20 g per gram of catalyst component is particularly preferred. The polymerization is generally carried out at temperature of from 20 to 120° C., preferably of from 40 to 80° C. When the polymerization is carried out in gas-phase the operating pressure is generally between 0.5 and 10 MPa, preferably between 1 and 5 MPa In the bulk polymerization the operating pressure is generally between 1 and 6 MPa preferably between 1.5 and 4 MPa Hydrogen or other compounds capable to act as chain transfer agents can be used to control the molecular weight of polymer.

The following examples are given in order to better illustrate the invention without limiting it.

General Procedures and Characterizations
Preparation of Succinates: General Procedures Succinates can be prepared according to known methods described in the literature. Descriptive examples of procedures for the synthesis of the succinates exemplified in Table 1 are given below.

Alkylation

For literature see for example: N. R. Long and M. W. Rathke, Synth. Commun., 11 (1981) 687; W. G. Kofron and L. G. Wideman, J. Org. Chem., 37 (1972) 555.

Diethyl 2,3-diethyl-2-isopropylsuccinate (ex. 23)

To a mixture of 10 mL (72 mmol) of diisopropylamine in 250 mL of tetrahydrofuran (THF) was added 28.6 mL (72 mmol) of BuLi (2.5 molar in cyclohexanes) at −20° C. After 20 minutes stirring, 9.2 g (83% pure) (28.3 mmol) of diethyl 2,3-diethylsuccinate was added at −40° C. and after addition the mixture was stirred for 2 h at room temperature. Then this mixture was cooled to −70° C. and a mixture of 4.3 mL (43 mmol) of 2-iodopropane and 7.4 mL (43 mmol) of hexamethylphosphoramide (HMPA) was added. After addition the cooling was removed and the mixture was stirred for four days. The volatiles were removed and 250 mL of ether was added. The organic layer was washed twice with 100 mL of water. The organic layer was isolated, dried over $MgSO_4$, filtered and concentrated in vacuo yielding an orange oil. This oil was chromatographed over silica with $CH_2Cl_2$ yielding 2.3 g (30%) of a 96% pure product. According to gaschromatography (GC) only one isomer was present.

Oxidatve Coupling

For literature see for example: T. J. Brocksom, N. Petragnani, R. Rodrigues and H. La Scala Teixeira, Synthesis, (1975) 396; E. N. Jacobsen, G. E. Totten, G. Wenke, S. C. Karydas, Y. E. Rhodes, Synth. Commun., (1985) 301.

Diethyl 2,3-dipropylsuccinate (ex 18)

To a mixture of 46 mL (0.33 mol) of diisopropylamine in 250 mL of THF was added 132 mL (0.33 mol) of BuLi (2.5 molar in cyclohexanes) at −20° C. After 20 minutes stirring, 39 g (0.3 mol) of ethyl pentanoate was added at −70° C. and after addition the mixture was stirred for 1 h at this temperature. Then this mixture was added to a mixture of 33 mL (0.30 mol) of $TiCl_4$ and 200 mL of $CH_2Cl_2$ at −70° C. keeping the temperature below −55° C. After addition and subsequently 1 h stirring, the reaction mixture was quenched with 10 mL of water and then the temperature was slowly raised to room temperature. The volatiles were removed and 250 mL of ether was added. The organic layer was washed twice with 100 mL of water. The organic layer was isolated, dried over $MgSO_4$, filtered and concentrated in vacuo yielding an orange oil (contained yield was 77%). This oil was distilled which gave two fractions. The best fraction that was obtained was 13.5 g (35%) and 98% pure. The second fraction was 7.5 g and 74% pure.

Reduction meso Diethyl 2,3-dicyclobexylsuccinate (ex 22)

A stainless-steel autoclave was charged with a mixture of 6.7 g (0.02 mol) of meso diethyl 2,3-diphenylsuccinate, 180 mL of isopropanol, and 0.23 g of a 5 wt. % Rh/C catalyst. The mixture was hydrogenated for 18 h at 70° C. under a hydrogen pressure of 20 bar. The mixture was filtered over Celite and concentrated under reduced pressure yielding 6.8 g (yield 97%) of 99% pure product.

Esterification

For literature see for example: "Vogel's textbook of practical organic chemistry", $5^{th}$ Edition (1989), pages 695–707.

Diethyl 2-phenylsuccinate (ex 1)

A mixture of 50 g of DL-phenylsuccinic acid (0.257 mol), 90 mL (1.59 mol) of ethanol, 46 mL of toluene and 0.39 g of concentrated $H_2SO_4$ was heated to 115° C. An azeotropic mixture of ethanol, toluene and water was distilled over a column of 10 cm. When the distillation stopped the same amounts of ethanol and toluene was added. To obtain a complete conversion this was repeated twice. The resulting oil was distilled at 114° C. (2·10$^{-2}$ mbar); yield 60.82 g (95%), purity 100%

S$_N$2 Coupling

For literature see for example: N. Petragnani and M. Yonashiro, Synthesis, (1980) 710; J. L. Belletire, E. G. Spletzer, and A. R. Pinhas, Tetrahedron Lett., 25 (1984) 5969.

Diisobutyl 2,2,3-trimethylsuccinate (ex 14)

Isobutyric acid (14.6 mL, 157 mmol) was added to a freshly prepared lithium diisopropyl amide (LDA) solution (see synthesis of succinate ex 23, 41 mL, 314 mmol of diisopropylamine and 126 mL of BuLi (2.5 M in hexanes; 314 mmol) and 1 L of THF) at 0° C. This mixture was stirred at 0° C. for 15 minutes and subsequently for 4 h at 45° C.

Meanwhile in a separate reaction vessel, a mixture of 14.1 mL (157 mmol) of 2-bromopropionic acid and 28 g (157 mmol) of HMPA was added to a suspension of 3.8 g (157 mmol) of NaH in 500 mL of THF at 0° C. while controlling the gas formation. After addition the mixture was stirred for 15 minutes at 0° C. Then this mixture was added to the mixture of the lithium salt of isobutyric acid (described above) at 0° C. After addition the mixture was stirred for 2 h at 35° C. This mixture was quenched with 150 mL of a NaCl saturated 1 N HCl solution at 0° C. This mixture was extracted twice with 100 mL of diethyl ether and the combined ether layers were extracted with 50 mL of a saturated NaCl solution. The organic layer was dried over MgSO$_4$ and concentrated in vacuo yielding a yellow oil. This oil was dissolved in 150 mL of isobutanol, 100 mL of toluene and 2 mL of concentrated H$_2$SO$_4$. This mixture was heated to reflux with a Dean Stark set-up to remove the water. After two days the conversion was complete. The reaction mixture was concentrated in vacuo and the resulting oil was distilled at 155° C. (75 mbar); yield 5.1 g (12%), purity 98%.

Combined Methods

Most of the succinates were prepared by a combination of methods described above. The different methods used for the synthesis of the succinates exemplified in Table 1 are further specified in Table A. The sequential order in which the methods were used is indicated alphabetically by a, b and c.

TABLE A

| Succinate | Methods of synthesis | | | | |
|---|---|---|---|---|---|
| (for type see Table 1) | Esterification | Alkylation | Reduction | oxidative coupling | S$_N$2 coupling |
| 1 | A | | | | |
| 2 | A | | b | | |
| 3 | A | | b | | |
| 4 | | A | | | |
| 5 | | A | b | | |
| 12 | | A | | | |
| 13 | | A | b | | |
| 14 | | | | | a |
| 15 | a | B | | | |
| 16 | a | B | c | | |
| 18 | | | | a | |
| 22 | a | | b | | |
| 23 | | B | | a | |
| 24 | | B | | a | |
| 25 | | B | | a | |
| 26 | a | C | b | | |
| 27 | | | | a | |
| 30 | | | | | a |

Polymerization

Propylene Polymerization: General Procedure

In a 4 liter autoclave, purged with nitrogen flow at 70° C. for one our, 75 mL of anhydrous hexane containing 800 mg of AlEt$_3$, 79.8 mg of dicyclopentyldimethoxysilane and 10 mg of solid catalyst component; were introduced in propylene flow at 30° C. The autoclave was closed. 1.5 NL of hydrogen were added and then, under stirring, 1.2 kg of liquid propene were fed. The temperature was raised to 70° C. in five minutes and the polymerization was carried out at this temperature for two hours. The nonreacted propylene was removed, the polymer was collected, dried at 70° C. under vacuum for three hours, weighed, and fractionated with o-xylene to determine the amount of the xylene insoluble (X.I.) fraction at 25 C.

Ethylene/1-butene Polymerization: General Procedure 4.0 liter stainless-steel autoclave equipped with a magnetic stirrer, temperature, pressure indicator, feeding line for ethene, propane, 1-butene, hydrogen, and a steel vial for the injection of the catalyst, was purified by fluxing pure nitrogen at 70° C. for 60 minutes. It was then washed with propane, heated to 75° C. and finally loaded with 800 g of propane, 1-butene (as reported in Table 4), ethene (7.0 bar, partial pressure) and hydrogen (2.0 bar, partial pressure).

In a 100 mL three neck glass flask were introduced in the following order, 50 mL of a anhydrous hexane, 9.6 mL of 10% by wt/vol, TEAL/hexane solution, optionally an external donor (E.D., as reported in Table 4) and the solid catalyst. They were mixed together and stirred at room temperature for 20 minutes and then introduced in the reactor through the steel vial by using a nitrogen overpressure.

Under continuous stirring, the total pressure was maintained constant at 75° C. for 120 minutes by feeding ethene. At the end the reactor was depressurised and the temperature was dropped to 30° C. The collected polymer was dried at 70° C. under a nitrogen flow and weighted.

Determination of Xylene Insolubles (X.I.)

2.5 g of polymer were dissolved in 250 mL of o-xylene under stirring at 135° C. for 30 minutes, then the solution was cooled to 25° C. and after 30 minutes the insoluble polymer was filtered The resulting solution was evaporated in nitrogen flow and the residue was dried and weighed to determine the percentage of soluble polymer and then, by difference the xylene insoluble fraction (%)

Determination of Comonomer Content in the Copolymer:

1-Butylene was determined via infrared spectrometry.

Thermal Analysis:

Calorimetric measurements were performed by using a differential scanning calorimeter DSC Mettler. The instrument is calibrated with indium and tin standards. The weighted sample (5–10 mg), obtained from the melt index determination, was sealed into aluminum pans, heated to 200° C. and kept at that temperature for a time long enough (5 minutes) to allow a complete melting of all the crystallites. Successively, after cooling at 20° C./min to −20° C., the peak temperature was assumed as crystallization temperature (Tc). After standing 5 minutes at 0° C., the sample was heated to 200° C. at a rate of 10° C./min. In this second heating run, the peak temperature was assumed as melting temperature (Tm) and the area as the global melting enthalpy (ΔH)

Determination of Melt Index (M.I.):

Melt index was measured at 190° C. following ASTM D-1238 over a load of:

2.16 kg, MI E=MI2.16.

21.6 kg, MI F=MI21.6.

The ratio: F/E=MI F/MI E=MI21.6/MI2.16 is then defined as melt flow ratio (MFR)

Determination of Density:

Density was determined on the homogenized polymers (from the M.I. determination) by using a gradient column and following the ASTM D-1505 procedure.

Determination of Polydispersity Index (P.I.)

This property is strictly connected with the molecular weight distribution of the polymer under examination. In particular it is inversely proportional to the creep resistance of the polymer in the molten state. Said resistance called modulus separation at low modulus value (500 Pa), was determined at a temperature of 200° C. by using a parallel plates rheometer model RMS-800 marketed by RHEOMETIRICS (USA), operating at an oscillation frequency which increases from 0.1 rad/sec to 100 rad/sec. From the modulus separation value, one can derive the P.I. by way of the equation:

$$P.I.=54.6*(modulus\ separation)^{-1.76}$$

in which the modulus separation is defined as:

modulus separation=frequency at G'=500 Pa/frequency at G"=500 Pa wherein G' is storage modulus and G" is the loss modulus.

EXAMPLES

Examples 1–27 and Comparative Examples 28–30
Preparation of Solid Catalyst Components.

Into a 500 mL four-necked round flask, purged with nitrogen, 250 mL of $TiCl_4$ were introduced at 0° C. While stirring, 10.0 g of microspheroidal $MgCl_2*2.8C_2H_5OH$ (prepared according to the method described in ex.2 of U.S. Pat. No. 4,399,054 but operating at 3000 rpm instead of 10000 rpm) and 7.4 mmol of succinate were added. The temperature was raised to 100° C. and maintained for 120 min. Then, the stirring was discontinued, the solid product was allowed to settle and the supernatant liquid was siphoned off. Then 250 mL of fresh $TiCl_4$ were added. The mixture was reacted at 120° C. for 60 min and, then, the supernatant liquid was siphoned off. The solid was washed six times with anhydrous hexane (6×100 mL) at 60° C. Finally, the solid was dried under vacuum and analyzed. The type and amount of succinate (wt %) and the amount of Ti (wt %) contained in the solid catalyst component are reported in to Table 1. Polymerization results are reported in Table 2. The polymer obtained in the example 10 was characterized and it showed a polydispesity index of 6, a content of isotactic units expressed in terms of pentads of 98% and a flexural modulus of 2150 MPa.

TABLE 1

| Ex. no. | Succinate Type | Wt % | Ti Wt % |
|---|---|---|---|
| 1 | Diethyl phenylsuccinate | 15.3 | 4.0 |
| 2 | Diethyl cyclohexylsuccinate | 16.4 | 3.3 |
| 3 | Diisobutyl cyclohexylsuccinate | 11.9 | 3.1 |
| 4 | Diethyl benzylsuccinate | 12.8 | 2.1 |
| 5 | Diethyl cyclohexylmethylsuccinate | 15.3 | 3.2 |
| 6 | Diethyl 2,2-dimethylsuccinate | 13.0 | 2.6 |
| 7 | Diisobutyl 2,2-dimethylsuccinate | 12.1 | 3.2 |
| 8 | Diethyl 2-ethyl-2-methylsuccinate | 13.3 | 1.9 |
| 9 | Diisobutyl 2-ethyl-2-methylsuccinate | 15.2 | 3.3 |
| 10 | Diethyl 2,3-diisopropylsuccinate | 18.9 | 4.2 |
| 11 | Diisobutyl 2,3-diisopropylsuccinate | 17.2 | 4.2 |
| 12 | Diethyl 2,3-dibenzylsuccinate | 24.1 | 3.2 |
| 13 | Diethyl 2,3-bis(cyclohexylmethyl)succinate | 21.5 | 4.7 |
| 14 | Diisobutyl 2,2,3-trimethylsuccinate | 8.0 | 4.4 |
| 15 | Diethyl 2-benzyl-3-ethyl-3-methylsuccinate | 14.9 | 3.2 |
| 16 | Diethyl 2-(cyclohexylmethyl)-3-ethyl-3-methylsuccinate | 17.9 | 2.9 |

TABLE 1-continued

| Ex. no. | Succinate Type | Wt % | Ti Wt % |
|---|---|---|---|
| 17 | Diethyl t-butylsuccinate | 14.0 | 2.9 |
| 18 | Diethyl 2,3-di-n-propylsuccinate | 13.1 | 3.9 |
| 19 | Dimethyl 2,3-diisoproylsuccinate | 17.7 | 4.1 |
| 20 | Diisopropyl 2,3-diisopropylsuccinate | 13.7 | 4.3 |
| 21 | Di-n-butyl 2,3-diisopropylsuccinate | 17.4 | 4.6 |
| 22 | meso Diethyl 2,3-dicyclohexylsuccinate | 12.5 | 4.3 |
| 23 | Diethyl 2,3-diethyl-2-isopropylsuccinate | 17.0 | 4.4 |
| 24 | Diethyl 2,3-diisopropyl-2-methylsuccinate | 17.2 | 5.1 |
| 25 | Diethyl 2,3-diisopropyl-2-ethylsuccinate | 12.0 | 5.4 |
| 26 | Diethyl 2,3-dicyclohexyl-2-methylsuccinate | 20.0 | 5.3 |
| 27 | Diethyl 2,2,3,3-tetramethylsuccinate | 9.0 | 4.0 |
| Comp. 28 | Di-n-butyl succinate | 7.4 | 2.1 |
| Comp. 29 | Diethyl methylsuccctnate | 10.9 | 3.4 |
| Comp. 36 | Diisobutyl ethylsuccinate | 7.7 | 3.0 |

TABLE 2

| Example no. | Yield kgPP/gCat | X.I. Wt % |
|---|---|---|
| 1 | 20 | 98.3 |
| 2 | 35 | 97.4 |
| 3 | 28 | 97.3 |
| 4 | 22 | 96.6 |
| 5 | 33 | 97.8 |
| 6 | 37 | 97.2 |
| 7 | 44 | 97.0 |
| 8 | 44 | 98.6 |
| 9 | 42 | 97.3 |
| 10 | 61 | 98.4 |
| 11 | 69 | 98.8 |
| 12 | 42 | 96.1 |
| 13 | 39 | 97.0 |
| 14 | 29 | 96.6 |
| 15 | 36 | 96.0 |
| 16 | 42 | 96.8 |
| 17 | 25 | 97.0 |
| 18 | 41 | 96.7 |
| 19 | 37 | 98.4 |
| 20 | 40 | 97.4 |
| 21 | 62 | 98.5 |
| 22 | 58 | 95.0 |
| 23 | 43 | 96.2 |
| 24 | 50 | 94.9 |
| 25 | 40 | 95.0 |
| 26 | 50 | 96.0 |
| 27 | 36 | 95.5 |
| Comp. 28 | 9 | 96.0 |
| Comp. 29 | 11 | 95.8 |
| Comp. 30 | 12 | 96.0 |

Example 31

The procedure of examples 1–27 and comparative examples 28–30 was used, but, preparing the solid catalyst component rac diethyl 2,3-diisopropylsuccinate was added as succinate. The resulting solid catalyst component contained: Ti=4.8% by weight, rac diethyl 2,3-diisopropylsuccinate 16.8% by weight.

The above mentioned solid catalyst component was polymerized according to the general polymerization procedure but without using dicyclopentyldimethoxysilane. The polymer yield was 65 kg of polypropylene/g of solid catalyst component with X.I.=96.1%.

Examples 32–38

The solid catalyst component of example 10 was polymerized according to the general polymerization procedure but instead of dicyclopentyldimethoxysilane the electron donors of Table 3 were used. The amount and type of electron donor and the polymerization results are reported in Table 3

Comparative Example 39

The procedure of examples 1–27 and comparative examples 28–30 was used, but, preparing the solid catalyst component, 14 mmol of ethyl benzoate were added instead of the succinate compound. The resulting solid catalyst component contained: Ti=3.5% by weight, ethyl benzoate 9.1% by weight.

The above mentioned solid catalyst component was polymerized with the same procedure of example 38.

The polymerization result is reported in Table 3

TABLE 3

| Ex no. | External donor Type | mmol | Yield kg/g | X.I. % |
|---|---|---|---|---|
| 32 | Cyclohexylmethyldimethoxysilane | 0.35 | 61 | 97.9 |
| 33 | 3,3,3-trifluoropropylmethyldimethoxysilane | 0.35 | 58 | 96.8 |
| 34 | 3,3,3-trifluoropropyl(2-ethylpiperidyl)-dimethoxysilane | 0.35 | 70 | 98.2 |
| 35 | Diisopropyldimethoxysilane | 0.35 | 62 | 97.6 |
| 36 | 9,9-bis(methoxymethyl)fluorene | 0.35 | 70 | 98.0 |
| 37 | Diethyl 2,3-diisopropylsuccinate | 0.35 | 59 | 96.4 |
| 38 | Ethyl p-ethoxybenzoate | 3.00 | 20 | 98.1 |
| Comp. 39 | Ethyl p-ethoxybenzoate | 3.00 | 23 | 96.1 |

Example 40

The procedure of examples 1–27 and comparative examples 28–30 was used, but, preparing the solid catalyst component 7.4 mmol of diethyl 2,3-diisopropylsuccinate and 7.4 mmol of 9,9-bis(methoxymethyl)fluorene were added.

The resulting solid catalyst component contained: Ti=3.5% by weight, diethyl 2,3-diisopropylsuccinate=11.5% by weight and 9,9-bis(methoxymethyl)fluorene=6.9% by weight.

The above mentioned solid catalyst component was polymerized as in the general polymerization procedure. The polymer yield was 74 kg of polypropylene/g of solid catalyst component with X.I.=99.3%.

Example 41

The solid catalyst component of example 40 was polymerized according to the general polymerization procedure but without using dicyclopentyldimethoxysilane. The polymer yield was 100 kg of polypropylene/g of solid catalyst component with X.I.=98.6%.

Example 42

The procedure of examples 1–27 and comparative examples 28–30 was used, but, preparing the solid catalyst component, 7.4 mmol of 9,9-bis(methoxymethyl)fluorene were added instead of the succinate compound. The resulting solid catalyst component contained: Ti=3.5% by weight, 9,9-bis(methoxymethyl)fluorene=18.1% by weight.

The above mentioned solid catalyst component was polymerized according to the general polymerization procedure but instead of dicyclopentyldimethoxysilane, 0.35 mmol of diethyl 2,3-diisopropylsuccinate were used. The polymer yield was 84 kg of polypropylene/g of solid catalyst component with X.I.=98.6%.

Example 43

Preparation of Solid Catalyst Component

The spherical support, prepared according to the general method described in Ex. 2 of U.S. Pat. No. 4,399,054 (but operating at 3000 rpm instead of 10000 rpm) was subjected to thermal treatment, under nitrogen flow, within the temperature range of 50–150° C., until spherical particles having a residual alcohol content of about 35 wt.% (1.1 mol of alcohol per mol of $MgCl_2$) were obtained.

16 g of this support were charged, under stirring at 0° C., to a 750 mL reactor containing 320 mL of pure $TiCl_4$. 3.1 mL of diethyl 2,3-diisopropylsuccinate, were slowly added and the temperature was raised to 100° C. in 90 minutes and kept constant for 120 minutes. Stirring was discontinued, settling was allowed to occur and the liquid phase was removed at the temperature of 80° C. Further 320 mL of fresh $TiCl_4$ were added and the temperature was raised to 120° C. and kept constant for 60 minutes. After 10 minutes settling the liquid phase was removed at the temperature of 100° C. The residue was washed with anhydrous heptane (300 mL at 70° C. then 3 times (250 mL each time) then with anhydrous hexane at 60° C. The component in spherical form was vacuum dried at 50° C.

The catalyst composition was as follow:

| | |
|---|---|
| Ti | 2.9 wt. % |
| diethyl 2,3-diisopropylsuccinate | 3.8 wt. % |
| Solvent | 13.5 wt. % |

Ethylene Polymerization:

A 4.0 liter stainless-steel autoclave equipped with a magnetic stirrer, temperature and pressure indicator, feeding line for ethene, propane, hydrogen, and a steel vial for the injection of the catalyst was used and purified by fluxing pure nitrogen at 70° C. for 60 minutes and than washed with propane.

In the following order 50 mL of anhydrous hexane, 5 mL of 10% by wt/vol, TEAL/hexane solution and 0.019 g of the solid catalyst were mixed together at room temperature, aged 20 minutes and introduced in the empty reactor in propane flow. The autoclave was closed and 800 g of propane were introduced, then the temperature was raised to 75° C. and ethylene (7.0 bar, partial pressure) and hydrogen (3.0 bar, partial pressure) we readded.

Under continuous stirring, the total pressure was maintained at 75° C. for 180 minutes by feeding ethene. At the end the reactor was depressurised and the temperature was dropped to 30° C. The collected polymer was dried at 70° C. under a nitrogen flow. 375 g of polyethylene were collected. The polymer characteristics are reported in Table 5.

Example 44

The solid catalyst of the example 43 was used in the ethylene/1-butene copolymerization as reported in the general procedure but without using any external donor.

The other polymerization conditions are reported in Table 4 while the polymer characteristics are collected in Table 5.

Example 45

The solid catalyst of the example 43 was used in the ethylene/1-butene copolymerization as reported in the general procedure but by using 0.56 mmol of cyclohexylmethyldimethoxysilane as external donor.

The other polymerization conditions are reported in Table 4 while the polymer characteristics are collected in Table 5.

Example 46

The solid catalyst of the example 43 was used in the ethylene/1-butene copolymerization as (reported in the general procedure but by using 0.56 mmol of diethyl 2,3-diisopropylsuccinate as external donor.

The other polymerization conditions are reported in Table 4 while the polymer characteristics are collected in Table 5.

Example 47

The solid catalyst of the example 43 was used in the ethylene/1-butene copolymerization in a fluidized gas-phase reactor as described below.

A 15.0 liter stainless-steel fluidized reactor equipped with gas-circulation system, cyclone separator, thermal exchanger, temperature and pressure indicator, feeding line for ethylene, propane, 1-butene, hydrogen, and a 1 L steel reactor for the catalyst prepolymerization and injection of the prepolymer. The gas-phase apparatus was purified by fluxing pure nitrogen at 40° C. for 12 hours and then was circulated a propane (10 bar, partial pressure) mixture containing 1.5 g of TEAL at 80° C. for 30 minutes. It was then depressurized and the reactor washed with pure propane, heated to 75° C. and finally loaded with propane (2 bar partial pressure), 1-butene (as reported in Table 4), ethylene (7.1 bar, partial pressure) and hydrogen (2.1 bar, partial pressure).

In a 100 mL three neck glass flask were introduced in the following order, 20 mL of anhydrous hexane, 9.6 mL of 10 % by wt/vol, TEAL/hexane solution and the solid catalyst of the example 43 (in the amount reported in Table 4). They were mixed together and stirred at room temperature for 5 minutes and then introduced in the prepolymerization reactor maintained in a propane flow.

The autoclave was closed and 80 g of propane and 90 g of propene were introduced at 40° C. The mixture was allowed stirring at 40° C. for 30 minutes. The autoclave was then depressurized to eliminate the excess of unreacted propene, and the obtained prepolymer was injected into the gas-phase reactor by using a propane overpressure (1 bar increase in the gas-phase reactor). The final pressure, in the fluidized reactor, was maintained constant at 75° C. for 180 minutes by feeding a 10 wt. % 1-butene/ethene mixture.

At the end, the reactor was depressurised and the temperature was dropped to 30° C. The collected polymer was dried at 70° C. under a nitrogen flow and weighted.

The polymer characteristics are collected in Table 5.

Example 48

Preparation of Solid Catalyst Component

The procedure of example 43 was repeated but instead of diethyl 2,3-diisopropylsuccinate was diisobutyl phthalate (11.8 mmol). The characteristics of the dried catalyst were as follow:

| | |
|---|---|
| Ti | 2.3 wt. % |
| diisobutyl phthalate | 4.4 wt. % |
| Solvent | 5.5 wt. % |

The solid catalyst was then used in the ethylene/1-butene copolymerization as reported in the general procedure but using diethyl 2,3-diisopropylsuccinate as E.D.

The other polymerization conditions are reported in Table 4 while the polymer characteristics are collected in Table 5.

TABLE 4

Ethylene (co)polymerization

| Example | Catalyst Mg | E.D. Type | E.D. Mmol | Al/ E.D. | 1-but n G | tim min | Polymer Yield g | kg/ gCat |
|---|---|---|---|---|---|---|---|---|
| 43 | 19.0 | — | — | — | — | 180 | 375 | 19.7 |
| 44 | 21.0 | — | — | — | 170 | 120 | 300 | 14.3 |
| 45 | 38.8 | CHMMS | 0.56 | 15 | 200 | 120 | 470 | 12.1 |
| 46 | 22.0 | Diethyl 2,3-di-iso-propyl-succinate | 0.56 | 15 | 200 | 120 | 255 | 11.6 |
| 47 | 46.0 | — | — | — | 330* | 180 | 815 | 17.7 |
| 48 | 39.5 | Diethyl 2,3-di-iso-propyl-succinate | 0.56 | 15 | 200 | 120 | 290 | 7.3 |

CHMMS = Cyclohexyl-methyl-dimethoxysilane

TABLE 5

Copolymer characterization

| Polymer Example | Melt Index E dg/min | Melt Index F dg/min | F/E | 1-C4- (I.R.) Wt. % | Density g/mL | D.S.C. Tc ° C. | D.S.C. Tm ° C. | DH J/g | X.S. wt. % |
|---|---|---|---|---|---|---|---|---|---|
| 43 | 0.44 | 13.9 | 31.6 | — | — | — | — | — | — |
| 44 | 0.86 | 26.7 | 31.5 | 10.1 | 0.9174 | 105 | 124.8 | 126 | 14.9 |
| 45 | 1.0 | 28.1 | 28.1 | 9.8 | 0.9170 | 105 | 123.7 | 125 | 14.8 |
| 46 | 0.79 | 25.8 | 32.6 | 8.4 | 0.9199 | n.d. | n.d. | n.d. | n.d. |
| 47 | 2.3 | 77.1 | 33.5 | 10.5 | 0.9136 | 106 | 123.9 | 118 | n.d. |
| 48 | 0.84 | 29.5 | 35.1 | 12.8 | 0.9165 | 107 | 126.0 | 116 | n.d. | n.d. = not determined

What is claimed is:

1. A solid catalyst component for the polymerization of olefins CH$_2$=CHR, in which R is hydrogen or a hydrocarbyl radical with 1–12 carbon atoms, comprising Mg, Ti, halogen and an electron donor selected from succinates of formula (I):

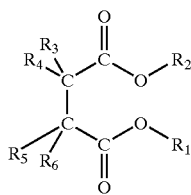

wherein the radicals $R_1$ and $R_2$, equal to or different from each other, are a $C_1$–$C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_1$–$C_{20}$ linear or branched alkyl, cycloalkyl, aryl, arylalkyl or alkylaryl group, optionally containing heteroatoms, and the radicals $R_3$ to $R_6$ which are joined to the same carbon atom can be linked together to form a cycle; with the proviso that when $R_3$ to $R_5$ are contemporaneously hydrogen, $R_6$ is a radical selected from the group consisting of primary branched, secondary and tertiary alkyl groups, cycloalkyl, aryl, arylalkyl and alkylaryl groups having from 3 to 20 carbon atoms.

2. The catalyst component according to claim 1 in which the electron donor of formula (I) is selected from those in which $R_1$ and $R_2$ are $C_1$–$C_8$ alkyl, cycloalkyl, aryl, arylalkyl or alkylaryl groups.

3. The catalyst component according to claim 2 in which $R_1$ and $R_2$ are selected from the group consisting of primary alkyls.

4. The catalyst component according to claim 1 in which the electron donor of formula (I) is selected from those in which $R_3$ to $R_5$ are hydrogen and $R_6$ is a branched alkyl, cycloalkyl, aryl, arylalkyl or alkylaryl radical having from 3 to 10 carbon atoms.

5. The catalyst component according to claim 4 in which $R_6$ is a branched primary alkyl group or a cycloalkyl group having from 3 to 10 carbon atoms.

6. The catalyst component according to claim 1 in which the electron donor of formula (I), is selected from those in which at least two radicals from $R_3$ to $R_6$ are different from hydrogen and are selected from the group consisting of $C_1$–$C_{20}$ linear or branched alkyl, cycloalkyl, aryl, arylalkyl and alkylaryl groups optionally containing heteroatoms.

7. The catalyst component according to claim 6 in which the two radicals different from hydrogen are linked to the same carbon atom.

8. The catalyst component according to claim 6 in which the two radicals different from hydrogen are linked to different carbon atoms.

9. The catalyst component according to claim 8 in which the succinate of formula (I) is selected from the group consisting of diethyl 2,3-diisopropylsuccinate, diisobutyl 2,3-diisopropylsuccinate, di-n-butyl 2,3-diisopropylsuccinate, diethyl 2,3-dicyclohexyl-2-methylsuccinate, diisobutyl 2,3-dicyclohexyl-2-methylsuccinate, diisobutyl 2,2-dimethylsuccinate, diethyl 2,2-dimethylsuccinate, diethyl 2-ethyl-2-methylsuccinate, diisobutyl 2-ethyl-2-methylsuccinate, diethyl 2-(cyclohexylmethyl)-3-ethyl-3-methylsuccinate, and diisobutyl 2-(cyclohexylmethyl)-3-ethyl-3-methylsuccinate.

10. The catalyst component according to claim 1 in which the succinates are used in the form of pure stereoisomers.

11. The catalyst component according to claim 1 in which the succinates are used in the form of mixtures of enantiomers, or mixture of diastereoisomers and enantiomers.

12. The catalyst component according to claim 9 in which diethyl 2,3-diisopropylsuccinate, diisobutyl 2,3-diisopropylsuccinate and di-n-butyl 2,3-diisopropylsuccinate are used as a pure rac or meso forms, or as mixtures thereof.

13. The catalyst component according to claim 1 wherein the Ti compound has at least a Ti-halogen bond and wherein the succinate of formula (I) is supported on a Mg dichloride in active form.

14. The catalyst component according to claim 13 in which the titanium compound is $TiCl_4$ or $TiCl_3$.

15. The catalyst component according to claim 1 further comprising an additional electron donor compound in addition to the succinate of formula (I).

16. The catalyst component according to claim 15 in which the additional electron donor compound is selected from the group consisting of ethers, esters of organic mono or bicarboxylic acids and amines.

17. The catalyst component according to claim 16 in which the additional electron donor compound is selected from the group consisting of (i) 1,3-propanediethers of formula (II);

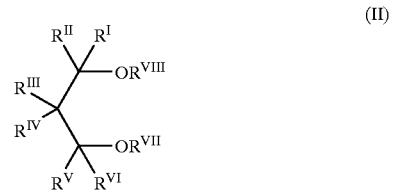

wherein $R^I$, $R^{II}$, $R^{III}$, $R^{IV}$, $R^V$ and $R^{VI}$ are equal or different to each other, are hydrogen or hydrocarbon radicals having from 1 to 18 carbon atoms, and $R^{VII}$ and $R^{VIII}$, equal or different from each other, have the same meaning of $R^I$–$R^{VI}$ except that they cannot be hydrogen; and wherein one or more of the $R^I$–$R^{VIII}$ groups can be linked to form a cycle and (ii) esters of organic mono or bicarboxylic acids.

18. The catalyst component according to claim 17 in which the additional electron donor compound is selected from the group consisting of phthalates and the 1,3-diethers of formula (II) in which $R^{VII}$ and $R^{VIII}$ are selected from $C_1$–$C_4$ alkyl radicals, $R^{III}$ and $R^{IV}$ form a condensed unsaturated cycle and $R^I$, $R^{II}$, $R^V$ and $R^{VI}$ are hydrogen.

19. A catalyst for the polymerization of olefins $CH_2$=CHR, in which R is hydrogen or a hydrocarbyl radical with 1–12 carbon atoms, comprising the product of the reaction between:

(a) a solid catalyst component for the polymerization of olefins $CH_2$=CHR, in which R is hydrogen or a hydrocarbyl radical with 1–12 carbon atoms, comprising Mg, Ti, halogen and an electron donor selected from succinates of formula (I):

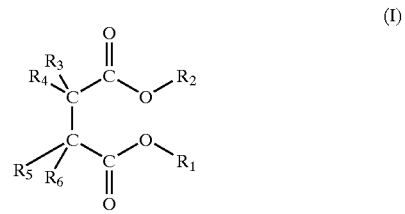

wherein the radicals $R_1$ and $R_2$, equal to or different from each other, are a $C_1$–$C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_1$–$C_{20}$ linear or branched alkyl, cycloalkyl, aryl, aryalkyl or alkylaryl group, optionally containing heteroatoms, and the radicals $R_3$ to $R_6$ which are joined to the same carbon atom can be linked together to form a cycle; with the proviso that when $R_3$ to $R_5$ are contemporaneously hydrogen, $R_6$ is a radical selected from the group consisting of primary branched, secondary and tertiary alkyl groups, cycloalkyl, aryl, aryalkyl and alkylaryl groups having from 3 to 20 carbon atoms;

(b) an alkylaluminum compound and, optionally,
(c) one or more external electron donor compounds.

20. The catalyst according to claim 19 in which the alkylaluminum compound (b) is a trialkyl aluminum compound.

21. The catalyst according to claim 20 in which the trialkylaluminum compound is selected from the group consisting of triethylaluminum, triisobutylaluminum, tri-n-butylaluminum, tri-n-hexylaluminum, and tri-n-octylaluminum.

22. The catalyst according to claim 19 in which the external donor (c) is selected from the 1,3-diethers of the general formula (II):

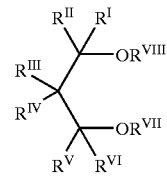

(II)

wherein $R^I$, $R^{II}$, $R^{III}$, $R^{IV}$, $R^V$ and $R^{VI}$ are equal or different to each other, are hydrogen or hydrocarbon radicals having from 1 to 18 carbon atoms, and $R^{VII}$ and $R^{VIII}$, equal or different from each other, have the same meaning of $R^I$–$R^{VI}$ except that they cannot be hydrogen; and wherein one or more of the $R^I$–$R^{VIII}$ groups can be linked to form a cycle.

23. The catalyst according to claim 22 in which the 1,3-diethers are selected from those in which $R^{VII}$ and $R^{VIII}$ are selected from $C_1$–$C_4$ alkyl radicals, $R^{III}$ and $R^{IV}$ form a condensed unsaturated cycle and $R^I$, $R^{II}$, $R^V$ and $R^{VI}$ are hydrogen.

24. The catalyst according to claim 23 in which the diether of formula (II) is 9,9-bis(methoxymethyl)fluorene.

25. The catalyst according to claim 19 in which the external donor (c) is a silicon compound of the formula $R_a^7R_b^8Si(OR^9)_c$, wherein a and b are integers from 0 to 2, c is an integer from 1 to 4 and the sum (a+b+c) is 4, and $R^7$, $R^8$ and $R^9$ are $C_1$–$C_{18}$ hydrocarbon groups optionally containing heteroatoms.

26. The catalyst according to claim 25 in which a is 1, b is 1 and c is 2.

27. The catalyst according to claim 25 in which $R^7$ and/or $R^8$ are branched alkyl, cycloalkyl or aryl groups with 3–10 carbon atoms optionally containing heteroatoms and $R^9$ is a $C_1$–$C_{10}$ alkyl group.

28. The catalyst according to claim 25 in which a is 0, c is 3 and $R_8$ is a branched alkyl or cycloalkyl group and $R^9$ is methyl.

29. A process for the (co)polymerization of olefins $CH_2$=CHR, in which R is hydrogen or a hydrocarbyl radical with 1–12 carbon atoms, carried out in the presence of the catalyst of claim 19.

30. The process according to claim 29 in which the olefin to be (co)polymerized is selected from the group consisting of ethene, propene, 1-butene, 4-methyl-1-pentene and 1-hexene.

31. The cataystt according to claim 27 wherein $R^9$ is a methyl group.

32. A catalyst for the polymerization of olefins $CH_2$=CHR, in which R is hydrogen or a hydrocarbyl radical with 1–12 carbon atoms, comprising the product of the reaction between:

(i) a solid catalyst component comprising Mg, Ti, halogen and an internal electron donor (d);
(ii) an alkylaluminum compound and,
(iii) a succinate of formula (I):

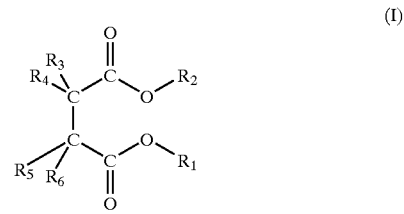

(I)

wherein the radicals $R_1$ and $R_2$, equal to or different from each other, are a $C_1$–$C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_1$–$C_{20}$ linear or branched alkyl, cycloalkyl, aryl, aryalkyl or alkylaryl group, optionally containing heteroatoms, and the radicals $R_3$ to $R_6$ which are joined to the same carbon atom can be linked together to form a cycle; with the proviso that when $R_3$ to $R_5$ are contemporaneously hydrogen, $R_6$ is a radical selected from the group consisting of primary branched, secondary and tertiary alkyl groups, cycloalkyl, aryl, arylalkyl and alkylaryl groups having from 3 to 20 carbon atoms.

33. The catalyst according to claim 32 in which the succinate of formula (I) is selected from those in which at least two radicals from $R_3$ to $R_6$ are different from hydrogen and are selected from $C_1$–$C_{20}$ linear or branched alkyl, cycloalkyl, aryl, arylalkyl or alkylaryl groups optionally containing heteroatoms.

34. The catalyst according to claim 33 in which the two radicals different from hydrogen are linked to different carbon atoms.

35. The catalyst according to claim 32 in which the internal donor (d) is selected from the group consisting of ethers, esters of organic mono or dicarboxylic acids and amines.

36. The catalyst according to claim 35 in which the internal donor (d) is selected from the group consisting of (i) 1,3-propanediethers of formula (II):

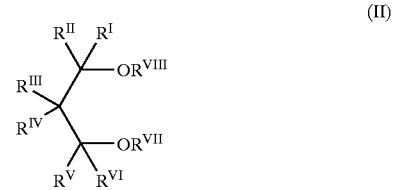

(II)

wherein $R^I$, $R^{II}$, $R^{III}$, $R^{IV}$, $R^V$ and $R^{VI}$ are equal or different to each other, are hydrogen or hydrocarbon radicals having from 1 to 18 carbon atoms, and $R^{VII}$ and $R^{VIII}$, equal or different from each other, have the same meaning of $R^I$–$R^{VI}$ except that they cannot be hydrogen; one or more of the $R^I$–$R^{VIII}$ groups can be linked to form a cycle and (ii) esters of organic mono or bicarboxylic acids.

37. The catalyst according to claim 36 in which the internal donor (d) is selected from the group consisting of phthalates and the 1,3-diethers of formula (II) in which $R^{VII}$ and $R^{VIII}$ are selected from $C_1$–$C_4$ alkyl radicals, $R^{III}$ and $R^{IV}$ form a condensed unsaturated cycle and $R^I$, $R^{II}$, $R^V$ and $R^{VI}$ are hydrogen.

38. A process for the (co)polymerization of olefins $CH_2=CHR$, in which R is hydrogen or a hydrocarbyl radical with 1–12 carbon atoms, carried out in the presence of the catalyst of claim 32.

39. A prepolymerized catalyst component for the polymerization of olefins $CH_2=CHR$, wherein R is hydrogen or a $C_1-C_{12}$ alkyl group, wherein the prepolymerized catalyst component comprises a solid for the polymerization of olefins $CH_2=CHR$, in which R is hydrogen or a hydrocarbyl radical with 1–12 carbon atoms, comprising Mg, Ti, halogen and an electron donor selected from succinates of formula (I):

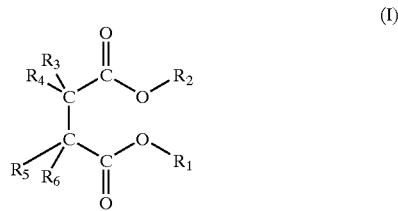

wherein the radicals $R_1$ and $R_2$, equal to or different from each other, are a $C_1-C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_1-C_{20}$ linear or branched alkyl, cycloalkyl, aryl, aryalkyl or alkylaryl group, optionally containing heteroatoms, and the radicals $R_3$ to $R_6$ which are joined to the same carbon atom can be linked together to form a cycle; with the proviso that when $R_3$ to $R_5$ are contemporaneously hydrogen, $R_6$ is a radical selected from the group consisting of primary branched, secondary and tertiary alkyl groups, cycloalkyl, aryl, aryalkyl and alkylaryl groups having from 3 to 20 carbon atoms and which solid for the polymerization of olefins $CH_2=CHR$ has been prepolymerized with an olefin to such an extent that the amount of the olefin pre-polymer is from 0.2 to 500 g per g of solid catalyst component.

40. The prepolymerized catalyst according to claim 39 in which the solid catalyst component has been prepolymerized with ethylene or propylene.

41. A process for the (co)polymerization of olefins $CH_2=CHR$, in which R is hydrogen or a hydrocarbyl radical with 1–12 carbon atoms, carried out in the presence of the catalyst of claim 39.

* * * * *